Aug. 6, 1940.  J. H. TAYLOR  2,210,223
HARROW
Filed Nov. 4, 1938    2 Sheets-Sheet 1
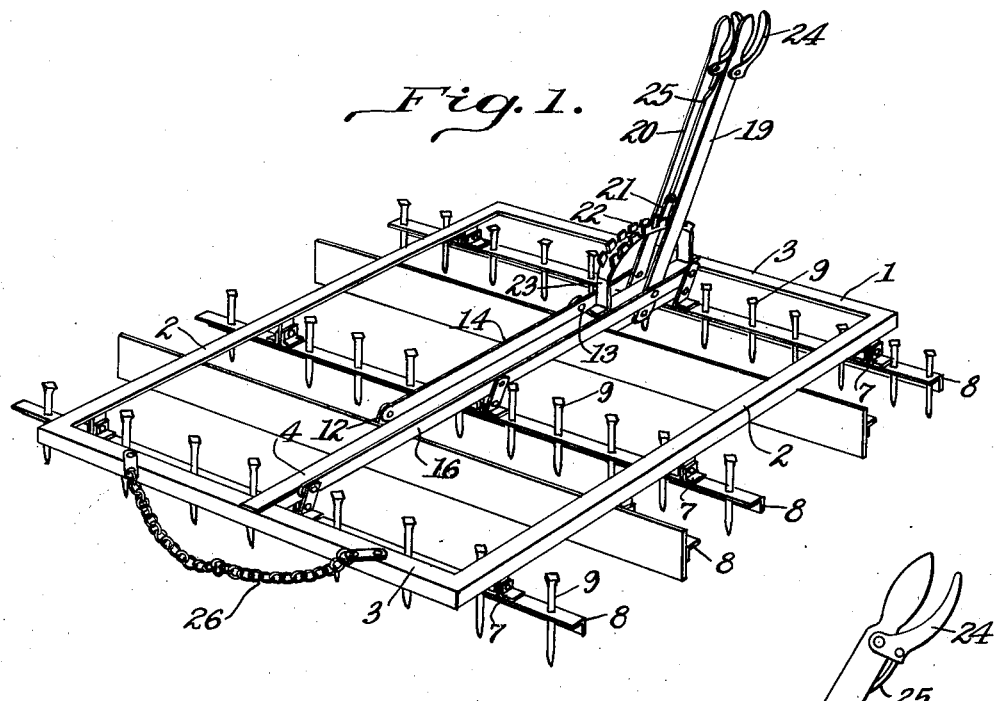
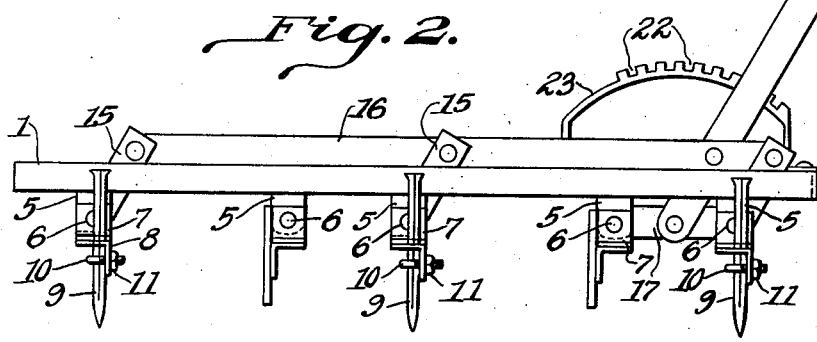
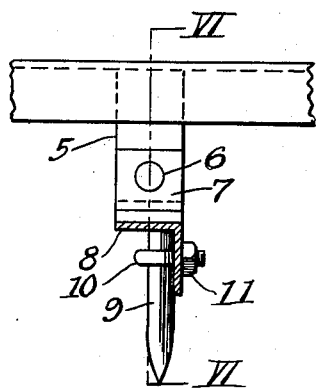
Inventor
John H. Taylor
By W. S. McDowell
Attorney Aug. 6, 1940.    J. H. TAYLOR    2,210,223
HARROW
Filed Nov. 4, 1938    2 Sheets-Sheet 2
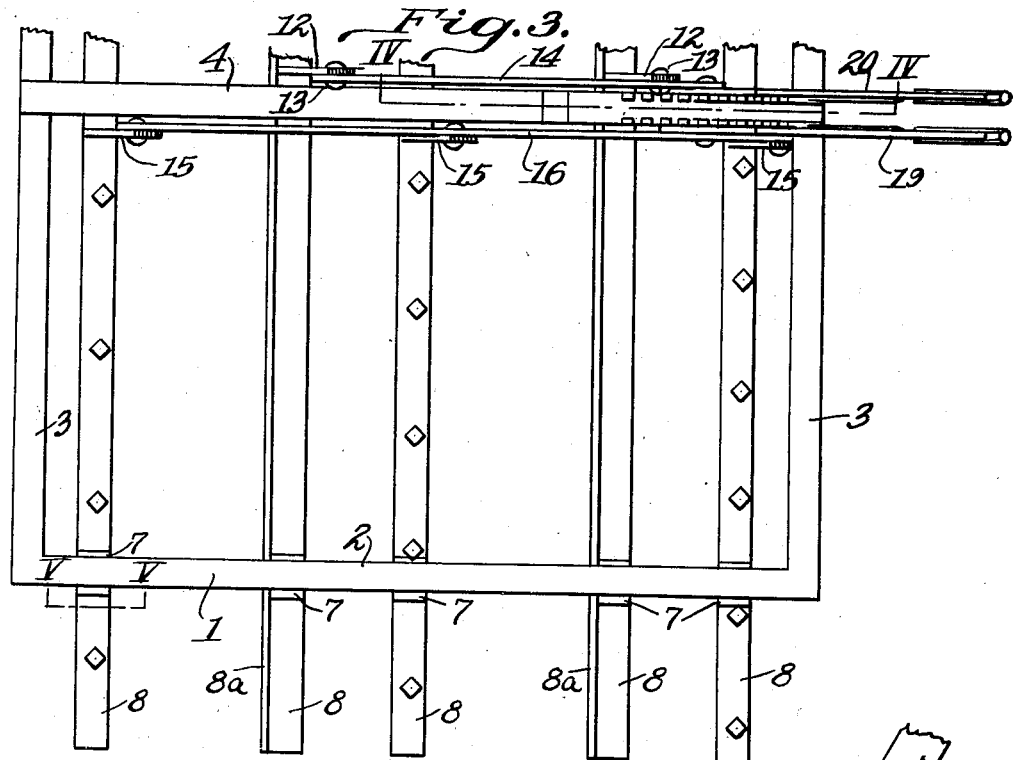
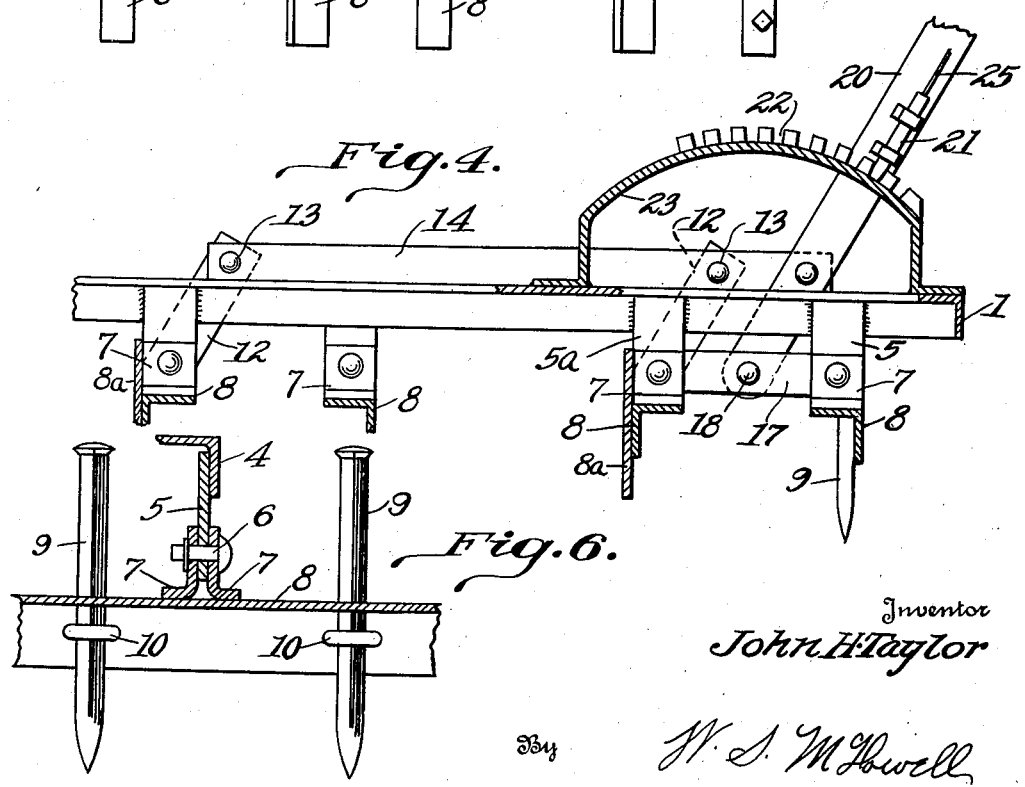
Inventor
John H. Taylor
By W. S. McHowell
Attorney Patented Aug. 6, 1940

2,210,223

UNITED STATES PATENT OFFICE 2,210,223

HARROW

John H. Taylor, Worthington, Ohio

Application November 4, 1938, Serial No. 238,821

6 Claims. (Cl. 55—23)

This invention relates generally to farm implements and is particularly directed to harrows used in breaking up plowed earth. At the present time, farmers, when preparing ground for seed, generally have a plurality of harrows in tandem following the plow. The first harrow is of the disk type having a plurality of sets of disks positioned at different angles to cut the ground and throw it to one side. These harrows cause an elongated mound of earth which must be leveled off before the seed can be planted. To this end, the disk harrows are followed by one or more harrows of the drag type and, if desired, others of the spike teeth variety. Such a multiplicity of harrows are objectionable because they are expensive to obtain and require a powerful force to drag them.

The primary object of this invention resides in the combination of a spike tooth and scraper blade harrow which will break up and smooth the earth in a single operation.

Another object resides in the provision of a harrow having alternately arranged scraper blades and spike teeth supports, the lower ends of the spikes being positioned below the lower edges of the scraper blades to penetrate the ground and break the lumps left by plowing.

It is a further object to provide a harrow with means for adjustably holding the spike members in order that they may be moved relatively to the supporting elements therefor so that their degree of penetration may be varied.

A still further object resides in providing a frame, to the under side of which are adjustably secured scraper blade and spike tooth supporting elements and connecting the similar elements for movement together, means being further provided to impart movement to the elements to vary their relation to one another and to the harrow frame. Means are also provided for locking the elements in their positions of adjustment.

Another object resides in arranging the scraper blades in closer proximity to the spike teeth behind them than to those in front in order to provide sufficient space to prevent the packing of earth at this point and the resulting inefficient operation of the harrow.

Additional objects will be apparent from the following description and the accompanying drawings, in which:

Fig. 1 is a perspective view of a harrow formed in accordance with the present invention;

Fig. 2 is a side elevational view of the harrow shown in Fig. 1;

Fig. 3 is a partial plan view of the harrow;

Fig. 4 is a vertical longitudinal sectional view taken through the harrow on the plane indicated by the line IV—IV of Fig. 3;

Fig. 5 is an enlarged detail sectional view taken on the plane indicated by the line V—V of Fig. 3;

Fig. 6 is a vertical sectional view taken on the plane indicated by the line VI—VI of Fig. 5.

The harrow comprising the present invention includes a rectangular frame 1 composed of longitudinally and transversely extending angle members 2 and 3 which are secured at their ends by welding or other well known methods. Approximately midway between the longitudinally extending members is a brace 4 which serves to strengthen the frame and form a support for the mechanism carried by the frame.

To the depending flanges of the elements 2 and 4, there are secured plates 5 provided adjacent their lower ends with openings for the reception of pivot pins 6 which extend through openings formed in bracket members 7 welded or otherwise secured to transversely extending scraper blade and spike supporting elements 8. These elements are formed from metallic angles and by reason of their pivotal connection to the supporting frame, they may be rocked about horizontal axes provided by the pins 6.

The alternate bars 8 commmencing with the first bar on the frame have their horizontal flanges provided with square holes through which similarly shaped spike teeth 9 project. The holes are disposed in close relation to the vertical flange of the angles so that the spike teeth will be reenforced by engagement therewith. In the event it is not feasible to form the openings so close to the vertical flanges of the angles, an insert may be placed between the spike teeth and the flanges. At the sides of each of the spikes, the vertical flanges have openings for the reception of U bolts 10, the looped portions engaging the front of the spikes. The spaced threaded ends of the bolts receive nuts 11 which serve to draw the bolts and the spikes into firm engagement with the flanges of the angles. If it is desired to adjust the spikes relative to the angles, the nuts may be loosened and the spikes moved up or down, then again locked by tightening the nuts. The number of spikes increases in the elements 8 toward the rear of the frame so that a greater effective area will be acted upon by the harrow.

The angle members between those supporting the spikes have elongated plates or blades 8a rigidly secured thereto. These angle members, in the form of the invention illustrated, are two in number and are connected by having their horizontal flanges provided with upwardly and rearwardly directed strips 12 which are perforated at their upper ends to receive rivets 13 pivotally securing a strip 14 thereto. The angle members carrying the spike teeth are similarly connected by plates 15 and a strip 16. The plates 5 carried by the center bar 4 at the rear thereof are connected by a short plate 17 which is provided at its center with an opening to receive a rivet 18 used to pivotally secure a pair of levers 19 and 20 thereto. The first of these levers is connected with the bar 16 and the second with the bar 14. By moving these levers, the angle members connected thereto by the strips 14 and 16 may be rocked on their pivots. This operation will result in varying the angularity of the scraper blades and spike teeth relative to the harrow frame.

To maintain the position of the levers, they are each provided on their inner or adjacent sides with spring pressed fingers 21, the lower ends of which are receivable within notches 22 in quadrant members 23 rigidly secured to the brace member 4. The upper ends of the levers have small supplemental levers 24 pivoted thereto which are connected by rods 25 to the fingers 21. When the levers 24 are moved toward the hand grips of the levers 19 and 20, the fingers 21 will be withdrawn from the notches in the quadrants and the levers may then be moved to adjust the position of the scraper blades and spike teeth. Either of the levers may be moved independently of the other. By moving the lever 19, the vertical distance between the lower ends of the spike teeth and the lower edges of the scraper blades may be varied according to the requirements of the operator. A chain 26 is secured to the forward transversely extending bar of the frame to serve as a connection with the tractor or other harrow moving device.

What is claimed is:

1. A harrow comprising a rectangular frame, at least three transversely extending angle bars, means connecting said bars to the under side of said frame for pivotal adjustment thereon, scraper plates rigidly secured to certain of said transversely extending bars, spike teeth rigidly carried by the angle bars on either side of said plate supporting bars, manually operated means for adjusting the angularity of said scraper plates and spike teeth relative to said frame, and means for maintaining said members in their positions of adjustment.

2. A harrow comprising a rectangular frame, a plurality of transversely extending angle bars, means connecting said bars to the under side of said frame for pivotal adjustment thereon, substantially vertical scraper plates rigidly secured to certain of said transversely extending bars, spike teeth rigidly carried by the angle bars on either side of said plate supporting bars, means connecting said plate supporting angles to one another and said spikes supporting angles to one another whereby similar members will move in unison, manually operated means for adjusting the angularity of said scraper plates and spike teeth relative to said frame, and means for maintaining said members in their positions of adjustment.

3. A harrow comprising a rectangular frame, a plurality of transversely extending angle bars, means connecting said bars to the under side of said frame for pivotal adjustment thereon, scraper plates disposed on edge and rigidly secured to certain of said transversely extending bars, spike teeth rigidly carried by the angle bars on either side of said plate supporting bars, means connecting said plate supporting angles to one another and said spike supporting angles to one another whereby similar members will move in unison, a pair of levers pivotally supported in connection with said frame, and means connecting said levers to said angle connecting members.

4. A harrow comprising a rectangular frame, a plurality of transversely extending angle bars pivotally secured to the under side of said frame in substantially equally spaced relation, a transversely extending angle bar pivotally secured to said frame between adjacent first-mentioned angle bars, said last-mentioned angle bars being positioned in closer proximity to the bars behind than those in front, spike teeth carried by the first mentioned bars, scraper plates secured to the second mentioned bars, said spike teeth normally extending below the lower edges of said scraper plates, and means for adjusting said transversely extending bars to vary the vertical distance between the lower ends of said spike teeth and the lower edges of said scraper bars.

5. A harrow comprising a rectangular frame, at least three transversely extending angle bars, means connecting said bars to the under side of said frame for pivotal adjustment thereon, scraper plates rigidly secured to certain of said transversely extending bars, the faces of said plates normally being disposed in substantially vertical planes, spike teeth rigidly carried by the angle bars on either side of said plate supporting bars, manually operated means for adjusting the angularity of said scraper plates and spike teeth relative to said frame, and means for maintaining said members in their positions of adjustment.

6. A harrow comprising a frame, plate members projecting downwardly from said frame, at least three bar members extending transversely beneath said frame, separate means for pivotally connecting said bar members to said frame carried plate members, scraper plates rigidly secured to certain of said transversely extending bar members substantially throughout their length, spike teeth rigidly carried by the bar members on either side of said plate supporting bars, manually operated means disposed adjacent one end of said frame for adjusting the angularity of said scraper plates and spike teeth relative to said frame and independently of one another, and means carried by said frame adjacent said adjusting means for maintaining said members in various positions of adjustment.

JOHN H. TAYLOR.